W. ROCKSTROH.
CLUTCH MECHANISM.
APPLICATION FILED FEB. 16, 1914.

1,179,040.

Patented Apr. 11, 1916.

UNITED STATES PATENT OFFICE.

WALTER ROCKSTROH, OF KLEIN-SEDLITZ, GERMANY.

CLUTCH MECHANISM.

1,179,040.  Specification of Letters Patent.  Patented Apr. 11, 1916.

Application filed February 16, 1914. Serial No. 818,964.

*To all whom it may concern:*

Be it known that I, WALTER ROCKSTROH, engineer, subject of the King of Saxony, residing at Klein-Sedlitz, Germany, have invented certain new and useful Improvements in Clutch Mechanism, of which the following is a specification.

This invention relates to a safety device for use in connection with clutch mechanism, for example in printing and stamping presses and similar machines, the object of the device being to throw the machine out of operation in the event of its being overloaded. To this end the lever $i$ is secured to a fixed part of the machine frame and suitable rods or levers connected thereto are connected to the switching off or braking mechanism of the engine stopping the operation of the machine and actuating the brake. This brake may either act directly upon the fly-wheel itself or upon its operating disk.

According to the invention the kinetic energy of the fly-wheel is caused to act on a spring, which is operative in the direction of rotation of the fly-wheel, and is so compressed, when the normal load on the machine is exceeded, that a relative movement takes place between the fly-wheel and fly-wheel shaft, or between the fly-wheel and an intermediate member, such as a clutch member. This movement is utilized for actuating a pawl, which, during the normal operation of the machine, passes a lever for operating the brakes and the clutch mechanism, while said pawl in the moment in which the load of the machine exceeds a certain limit, will strike against said lever for operation of the brake and disengagement of the members of the clutch mechanism.

An embodiment of the invention is shown in the accompanying drawing, in which—

Figure 1:
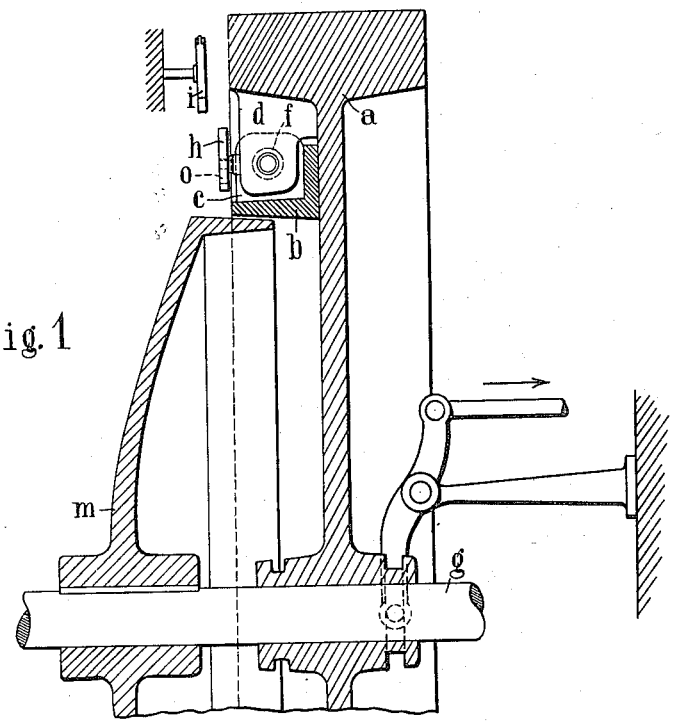
Figure 2:
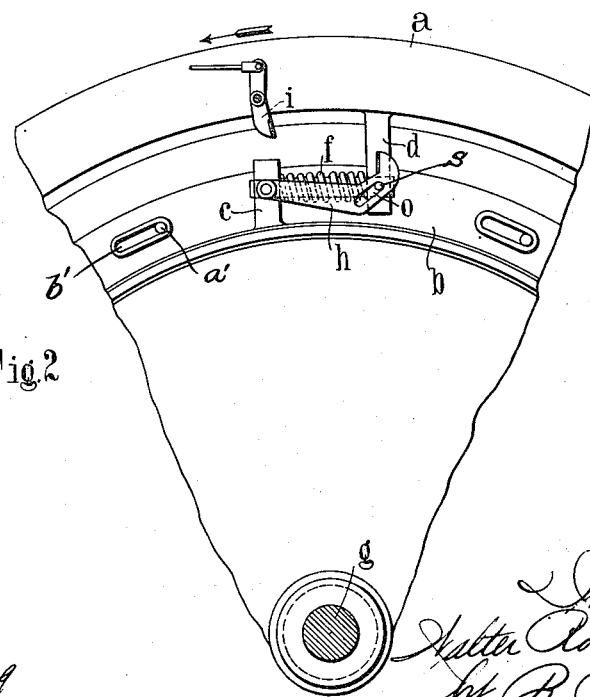

Figure 1 is a section of the device, and Fig. 2 is a front elevation.

Referring to the drawings, $g$ designates the fly-wheel shaft, from which the machine driven takes its driving power on which the clutch member $m$ is keyed, and $b$ is a ring, which transmits the kinetic energy of the fly-wheel to the clutch member $m$ and thus also to the fly-wheel shaft. The fly-wheel $a$ and ring $b$ are provided with lugs $d$ and $c$ respectively between which is disposed a spring $f$. A lever $h$, pivoted to the lug $c$, has an inclined slot $o$, in which engages a pin on the lug $d$. When the lug $d$ approaches the lug $c$ the lever $h$ is rocked about its pivot into its operative position, in which position it abuts against the double armed lever $i$, which is adapted to operate the brake and to disengage the members of the clutch mechanism, as hereafter more fully explained.

The ring $b$ is loosely mounted on the fly-wheel $a$, by means of pins $a'$ secured to the fly wheel, and working in slots $b'$ of said ring, so that the latter only causes the ring $b$ to rotate with it by means of the spring $f$. The ring $b$ forms one member of a friction clutch, the ring $m$ keyed to the fly-wheel shaft forming the other clutch member. When the machine is put into operation the fly-wheel is moved laterally so that the member $b$ is clutched to the member $m$, and the fly-wheel shaft is caused to rotate. This fly-wheel, however, is still capable of moving relatively to the ring $b$ in the event of the speed of rotation of the fly-wheel shaft being reduced by an overload on the machine. The movement of the fly-wheel relatively to the ring $b$ is of course limited by the reason of the lever being pivoted to the lug $c$ and by the pin engaging in the slot $o$.

The action of the device depends on the spring $f$ being of such power, that it will not allow the lever $h$ to be lifted into operative position until the maximum allowable load of the machine is exceeded. When the maximum load is exceeded the kinetic energy of the fly-wheel overcomes the resistance of the spring, and the fly-wheel overruns the ring $b$, causing the lug $d$ to approach the lug $c$, and the lever $h$ to be moved into its operative position; in the course of further rotation of the fly-wheel the lever $h$ strikes the double armed lever connected in any suitable manner to the brake and clutch operating mechanism of the machine and adapted to set the brakes and to disengage the members of the clutch mechanism. Said brake and clutch mechanisms are of any one of the well-known types and therefore, need no further description or illustration, as they do not form a part of the present invention.

Lever $i$ is reset or guided back into its original position when the brakes are released and the engine is started.

Having now particularly described and ascertained the nature of my said invention and in what manner the same is to be performed, I declare that what I claim is:—

1. In a device of the character described, the combination of a fly-wheel with a conical clutch member keyed to the shaft of said fly-wheel, a lug on the fly-wheel, a ring loosely mounted on said fly-wheel, a lug on said ring provided with a pin, yielding means for causing said ring to participate in the rotation of said wheel, means pivoted to the lug of said ring and having an inclined slot at its hooked end adapted to be engaged by the pin of the lug on said ring, a lever in the path of said hook end adapted to be engaged by the same if the torque transmitted from the ring to the clutch member is exceeding the strength of the means for causing said ring to participate in the rotation of said wheel, said means causing the ring to participate in the rotation of said wheel being adapted to return the parts into their original position, substantially as described and for the purpose set forth.

2. In a device of the character described, the combination of a fly-wheel with a conical clutch member keyed to the shaft of said fly-wheel, a lug on the fly-wheel, a ring loosely mounted on said fly-wheel, a lug on said ring provided with a pin, a spring disposed between said lugs for causing said ring to participate in the rotation of said wheel, a lever pivoted to the lug of said ring, an inclined slot at the hooked free end of said lever adapted to be engaged by the pin of the lug on said ring, a lever in the path of the hooked end of said lever adapted to be engaged by the same as soon as the torque transmitted from the ring to the clutch member is exceeding the strength of said spring and the kinetic energy of the fly-wheel overcomes the resistance of said spring, substantially as described and for the purpose set forth.

In testimony whereof I have hereunto set my hand in presence of two subscribing witnesses.

WALTER ROCKSTROH.

Witnesses:
LEO A. BERGHOLZ,
PAUL ARRAS.